United States Patent [19]

Matsumoto

[11] Patent Number: 4,933,707
[45] Date of Patent: Jun. 12, 1990

[54] PHOTOGRAPHIC PRINTING AND DEVELOPING SYSTEM

[75] Inventor: Fumio Matsumoto, Tokyo, Japan

[73] Assignee: Fuji Photo Film Co., Ltd., Kanagawa, Japan

[21] Appl. No.: 257,248

[22] Filed: Oct. 13, 1988

[30] Foreign Application Priority Data

Oct. 13, 1987 [JP] Japan .................. 62-257805
Oct. 13, 1987 [JP] Japan .................. 62-257806

[51] Int. Cl.$^5$ ............................ G03B 27/52
[52] U.S. Cl. ................................. 355/30
[58] Field of Search ............ 355/27, 28, 29, 30, 355/20, 18

[56] References Cited

U.S. PATENT DOCUMENTS

| | | | |
|---|---|---|---|
| 3,936,672 | 2/1976 | Tanaka | 355/30 X |
| 4,561,235 | 12/1985 | Yanagisawa et al. | 355/18 X |
| 4,742,375 | 5/1988 | Kogane et al. | 355/28 X |
| 4,785,321 | 11/1988 | Murasaki | 355/30 X |

FOREIGN PATENT DOCUMENTS

| | | | |
|---|---|---|---|
| 168161 | 8/1985 | Japan | 355/30 |
| 51165 | 3/1986 | Japan | 355/30 |
| 73968 | 4/1986 | Japan | 355/30 |

*Primary Examiner*—Donald A. Griffin
*Attorney, Agent, or Firm*—Sughrue, Mion, Zinn, Macpeak & Seas

[57] ABSTRACT

A photographic printing and developing device in which a continuous elongated photosensitive material is fed through a printing section in which the photosensitive material is exposed to light through a negative film so that an image on the negative film is printed on the photosensitive member. The photosensitive material is then fed through a developing section in which the printed image is developed and fixed. The system has a blower capable of introducing ambient air into a connecting section between the printing section and the developing section, and a control circuit capable of selectively operating the blower in accordance with a predetermined condition so as to maintain the humidity in the connecting section at an optimum level for feeding the photosensitive member from the printing section to the developing section.

20 Claims, 6 Drawing Sheets

PHOTOGRAPHIC PRINTING AND DEVELOPING SYSTEM

BACKGROUND OF THE INVENTION

1. Field of the Invention

The present invention relates to a photographic printing and developing system having a printing section in which an image is printed on a photosensitive material supplied from a photosensitive material supplying section, and a developing section in which a printed latent image is developed.

2. Related Art Statement

Hitherto, a photographic printing and developing system has a printing section for printing an image of a negative film on a photosensitive sheet and a developing section for developing a printed latent image which is connected to the printing section.

In general, there is a difference in the processing speed, i.e. feeding speed between the printing section and the developing section, so that the photographic printing and developing system of the kind described above usually has a sheet reserver section in which the difference between these speeds is suitably absorbed. The sheet reserver section usually has guide rollers disposed respectively in the printing section and the developing section, and an intermediate portion of the photosensitive sheet is suitably hung down in a loop state between both of the guide rollers, whereby the difference in the feeding speed between both sections is absorbed so as to ensure smooth feed and processing of the photosensitive sheet.

In general, the photosensitive sheet has an ability to absorb moisture, so that often the smooth feed of the photosensitive sheet is impaired. This is particularly true when the atmospheric condition in and around the sheet reserver section is highly humid.

Namely, in such a case, the photosensitive sheet tends to unnecessarily cling about or wind around the a guide roller. In addition the photosensitive sheet folds as a result of moisture absorption or dew condensation on the guide rollers. On the other hand, when the atmospheric condition in the sheet reserver section is in low humidity, the photosensitive sheet is dried excessively which generates static electricity, and an electric charge of the static electricity spontaneously discharges with sparks when the electric charge reaches to certain electric potential. As a result the photosensitive sheet is undesirably exposed and that equipment incorporated in the photographic printing and developing system, particularly a microcomputer and various sensors, are hampered by radio noise which causes them to incorrectly function.

SUMMARY OF THE INVENTION

Accordingly, an object of the present invention is to provide a photographic printing and developing system in which an atmospheric condition in a section between a printing section and a developing section is controlled in such a manner so as to eliminate any tendency for a photosensitive sheet to cling, wind or fold in the section between the printing and developing sections, while avoiding generation of static electricity therein.

According to one aspect of the present invention, a photographic printing and developing system is provided which has a printing section in which an image is printed on a continuous elongated photosensitive sheet, and a developing section in which the printed image is developed. The device further includes a connecting section or an intermediate section through which both the printing section and the developing section are connected, so that the continuous elongated photosensitive sheet is fed through the printing section, the connecting section and the developing section whereby printing and development of images are conducted successively. The system of the present invention has an ambient air introduction apparatus for introducing ambient air into the connecting section, and a control apparatus for controlling the operation of the ambient air introduction apparatus in accordance with a predetermined condition.

In operation, ambient air is selectively introduced into the connecting section by the ambient air introduction apparatus under the control of the control apparatus. For instance, when the ambient condition of the connecting section is extremely mois, such as during the summer season, the control apparatus controls the ambient air introduction apparatus to introduce the ambient air into the connecting section so as to optimize the atmospheric condition for the smooth feeding of the photosensitive sheet in the connecting section.

On the other hand, when the ambient condition of the connecting section is dry, such as during the winter season, the control apparatus operates to enable the ambient air introduction apparatus to shut-off the ambient air when the humidity in the connecting section has come down below a predetermined value while allowing suitably moistened air to naturally flow from the developing section into the connecting section, thus avoiding any tendency for the photosensitive sheet to become excessively dry.

According to another aspect of the invention, a reversible ambient air introduction apparatus is used which, when operating in the forward direction, introduces the ambient air at least into the connecting section and, when operating in the backward direction, forcibly discharges air from at least the connecting section while introducing moistened air from the developing section. When the air in the connecting section has much humidity and therefore a large tendency exists to moisten the photosensitive sheet as described in the case of operation in the summer season, the reversible ambient air introducting apparatus operates in forward direction so as to lower the humidity in the connecting section until an optimum condition for the feeding of the photosensitive sheet is achieved.

On the other hand when the ambient air humidity in the connecting section is less than a predetermined value as described in the case of operation in the winter season, the ambient air introduction apparatus is reversely driven to expel the dry air from the connecting section while introducing moistened air from the developing section, thus maintaining the humidity in the connecting section at a level suitable for feeding the photosensitive sheet.

According to the present invention, it is thus possible to maintain, within the connecting section between the printing section and the developing section, an atmosphere which is an optimum for the smooth feed of the photosensitive sheet, regardless of the seasonal change in the atmospheric condition.

DESCRIPTION OF THE PREFERRED EMBODIMENTS

Figure 1:
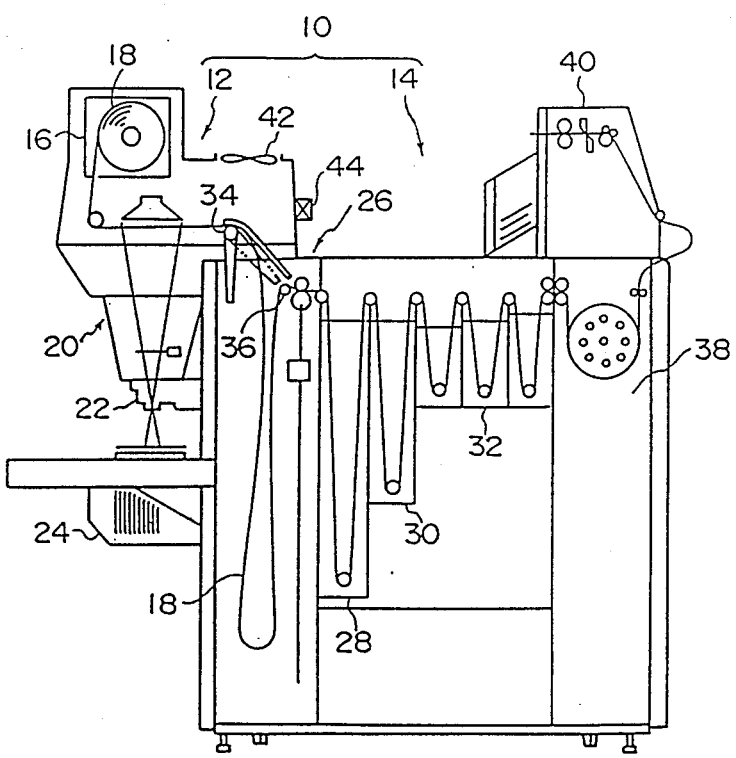
FIG. 1 is a schematic sectional view of a first embodiment of a photographic printing and developing system in accordance with the present invention.

FIG. 1 shows schematically and sectionally a first embodiment of a photographic printing and developing system of the present invention.

The photographic printing and developing system is composed of a printing section 12 and a developing section 14. A photosensitive sheet magazine 16 acting as the photosensitive sheet supply section is annexed to the printing section 12. The photosensitive sheet magazine 16 accommodates a roll of a continuous elongated photosensitive sheet 18. A suitable sheet feeding apparatus is provided for extracting the photosensitive sheet 18 from the magazine 16 and for feeding the extracted sheet successively to the printing section 12. The printing section 20 has an optical system 22 and a light source 24 which cooperate with each other in exposing the photosensitive sheet 18 to a light which is transmitted through a negative film, whereby an image carried by the film is printed on the photosensitive sheet 18. The photosensitive sheet 18 is fed intermittently such that printing is conducted on each frame while the photosensitive sheet 18 is kept stationary.

The photosensitive sheet 18 carrying a latent image printed thereon is then fed to the developing section 14 through a connecting section 26 which is referred to as a "reserver section" hereafter.

The reserver section 26 has a pair of guide rollers 34 and 36 which are disposed adjacent to the printing section 12 and adjacent to the developing section 14, respectively, so that the connecting portion of the photosensitive sheet 18 between the printing section 12 and the developing section 14 slacks to form a loop in the region between these guide rollers 34 and 36.

The size of the loop can vary according to the amount of feed of the photosensitive sheet 18 so that the difference between the speed of feed of the photosensitive sheet in the printing section 12 and that in the developing section 14 is absorbed, whereby a smooth feed of the photosensitive sheet 18 is ensured during printing and development.

The developing section 14 has a developing tank 28, a bleaching and fixing tank 30 and a water-rinsing tank 32. These tanks 28, 30 and 32 maintain baths of the respective processing liquids through which the photosensitive sheet 18 passes to develop the latent image.

A drying chamber 38 is disposed on one side of the water-rinsing tank 32 so that the photosensitive sheet 18 after the development is dried, and the dried photosensitive sheet is made to pass through a cutter device 40 so as to be cut into independent pieces.

Figure 2:
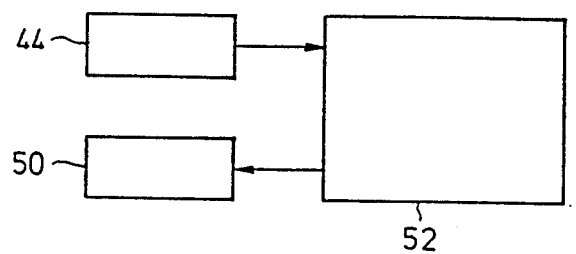
FIG. 2 is a block diagram of the first embodiment.

A blower 42, serving as a portion of an ambient air introduction apparatus, is disposed above the reserver section 26. The blower 42 is capable of positively introducing ambient air into the reserver section 26 and the printing section 20. A humidity sensor 44 disposed in the vicinity of the blower 42 is capable of detecting the humidity of the ambient air. As will be seen from FIG. 2, the humidity sensor 44 is connected to a control circuit 46. Thus, the control circuit 46 is capable of receiving a humidity signal which represents the level of humidity detected by the humidity sensor 44. The control circuit 46 has a function for selectively operating the blower 42 in accordance with the signal derived from the humidity sensor 44.

In the operation of the photographic printing and developing system, the photosensitive sheet 18 is continuously extracted from the roll in the magazine 16 and is fed into the printing section 20 where the photosensitive sheet 18 is subjected to an image exposure so that an image carried by a negative film is printed on the photosensitive sheet 18. The leading end of the photosensitive sheet 18 is fed to the developing section 26 through the reserver section 26. In general, introduction of ambient air into the photosensitive sheet feeding line, particularly to the reserver section 26, is preferred even when the humidity of the ambient air is comparatively high, because the existence of an air stream of a moderate velocity reduces any tendency for the photosensitive sheet to stick to the guide roller.

For instance, in the summer season when the humidity of the air in the reserver section 26 is generally high, the humidity sensor 44 which is sensitive to the humidity of the ambient air delivers the humidity signal to the control circuit 46 so that the control circuit 46 functions to start the blower 42, whereby the ambient air is introduced into the reserver section 26 and the printing section 20 to dehydrate the photosensitive sheet 18. As a result, any tendency for the photosensitive sheet 18 to cling about the guide roller or to flex, which tends to occur when the photosensitive sheet 18 is excessively moistened, is eliminated.

Conversely, in the winter season in which the humidity of the ambient air is comparatively low, the level of the humidity in the reserver section 26 also decreases correspondingly. The humidity sensor 44, upon detection of the low humidity of the ambient air, delivers a humidity signal to the control circuit 46 so that the control circuit 46 controls the blower 42 thereby stopping the introduction of the ambient air into the reserver section 26. In this state, since the reserver section 26 communicates with the developing section 14, air which has been moderately moistened in the developing section 14 naturally flows into the reserver section 26. As explained before, a level of humidity in the reserver section 26 which is too low tends to cause the generation of electrostatic charges on the photosensitive sheet 18 which in turn causes a sparking discharge. The results are that the photosensitive sheet 18 is undesirably exposed to the light of the spark and the electronic devices in the photographic printing and developing system, e.g., a microcomputer and various sensors, are affected and fail to operate correctly. These problems, however, are overcome by the described embodiment because the humidity of the air in the reserver section 26 is prevented from becoming excessively low, by virtue of the natural flow of moistened air from the developing section.

Figure 3:
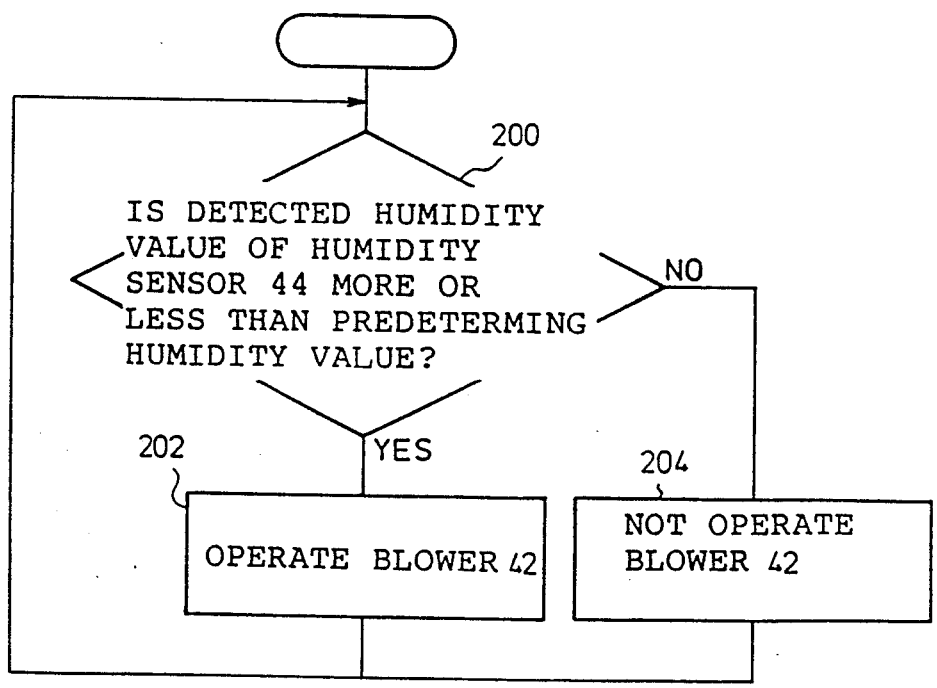
FIG. 3 is a flow chart illustrating an operation of the first embodiment.

This operation will be explained with reference to a flow chart shown in FIG. 3. In Step 200, a determination is conducted as to whether the level of the ambient air humidity detected by the humidity sensor 44 is not lower than a predetermined humidity level. When the detected humidity is not lower than the predetermined level, the process proceeds to Step 202 in which the control circuit 46 operates to start the blower 42, thereby introducing the ambient air into the reserver section 26 of the photographic printing and developing system. On the other hand, if the determination conducted in Step 200 has proved that the ambient air humidity is below the predetermined level, the process proceeds to Step 204 in which the control circuit 46 serves to stop the blower 42, thereby terminating the forcible supply of the ambient air into the reserver section 26.

The portion of the photosensitive sheet 18, having passed the reserver section 26 and now carrying a latent image thereon, is introduced into the developing section 14 so as to be processed through the developing bath in the tank 28, bleaching and fixing bath in the tank 30 and the rinsing bath in the tank 32. The thus processed photosensitive sheet is then dried in the drying chamber 38 and then cut by the cutter device 40, whereby independent photographs are obtained.

In the described embodiment, the blower 42 is selectively operated to effect and suspend the supply of the ambient air, under the control of the control circuit 46 which controls the operation of the blower in accordance with the result of the determination as to whether the humidity of the ambient air as detected by the humidity sensor 44 is below a predetermined level or not. This, however, is not exclusive, and the introduction of the ambient air into the reserver section 26 can be controlled in various other ways.

Figure 4:
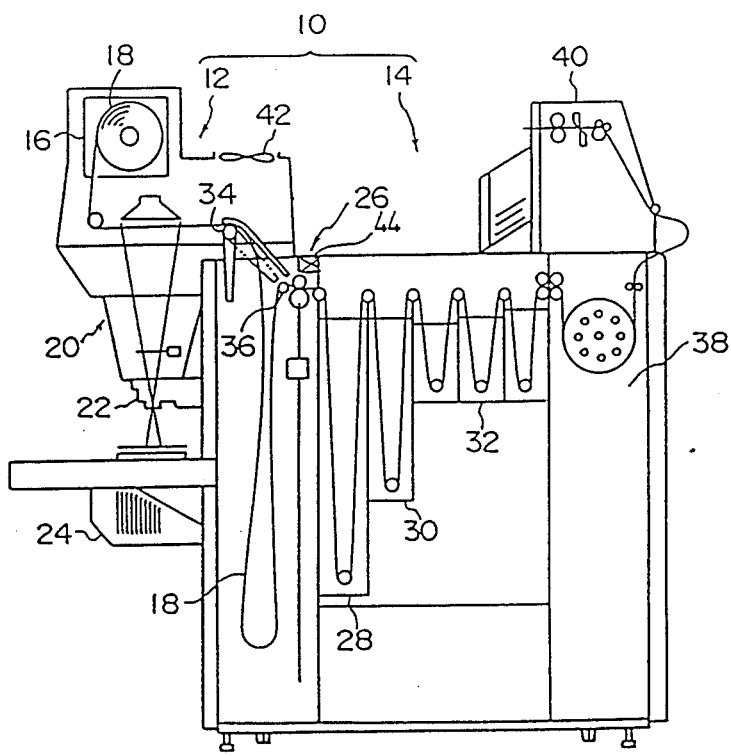
FIGS. 4 and 5 are illustrations of modifications of the first embodiment.

For instance, FIG. 4 shows a modification of the embodiment shown in FIG. 1. This modification is substantially the same as the described first embodiment except that the humidity sensor 44 is disposed inside the reserver 26 so as to detect the humidity in the reserver 26. The control circuit 46 then operates to stop the blower 42 when the humidity of the atmosphere in the reserver 26 has come down below a predetermined level.

Figure 5:
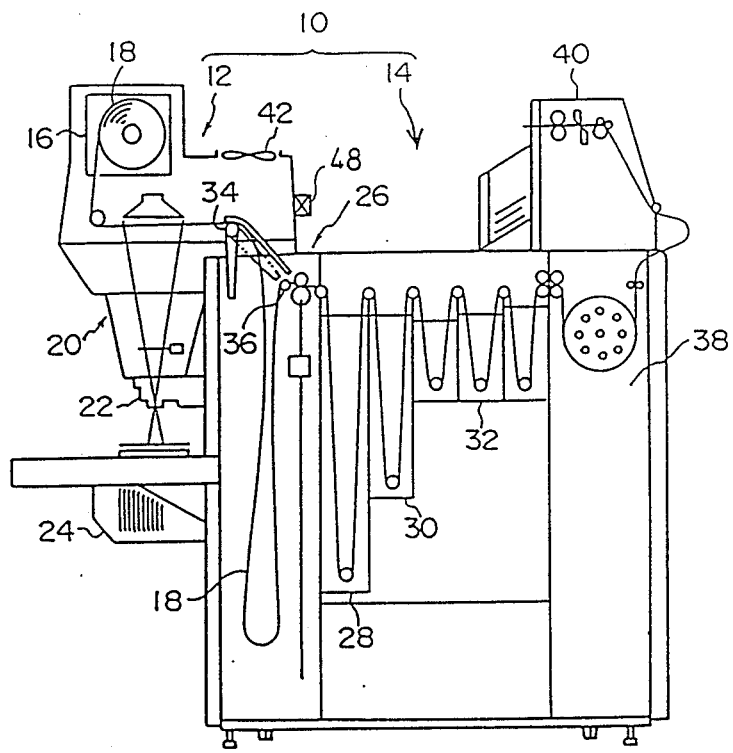

FIG. 5 shows another modification of the first embodiment shown in FIG. 1. In general, there is a tendency that the humidity of ambient air is high and low, respectively, in the summer and winter seasons and so is the humidity in the reserver section 26. This means that excessive drying of air in the reserver section 26 takes place in the winter season in which the ambient air temperature also is low. The modification shown in FIG. 5, therefore, employs a temperature sensor 44 which is capable of detecting the ambient air temperature, in place of the humidity sensor 44 used in the first embodiment. Thus, in the modification shown in FIG. 5, the blower is operated when the ambient air temperature is not lower than a predetermined level and is stopped when the ambient air temperature is below the predetermined level.

It is also possible that the operation of the blower is controlled in accordance with the result of a determination as to whether the electrostatic charge on the photosensitive sensor exceeds a predetermined level.

Although in the described embodiment and modifications the operation of the blower is automatically controlled in accordance with the state of the ambient air or the air in the reserver section 26, this is only illustrative and the invention does not exclude manual control of the blower conducted in such a manner as to selectively operate the blower or to vary the speed of the blower such as to maintain a moderate level of humidity of the air in the reserver section 26.

Figure 6:
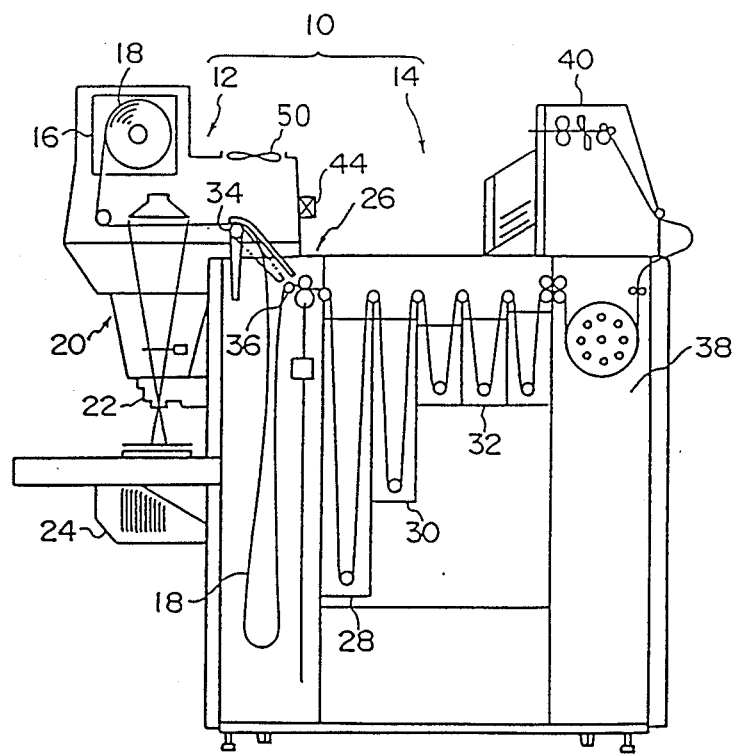
FIG. 6 is a schematic sectional view of a second embodiment of the photographic printing and developing system in accordance with the present invention.
Figure 7:
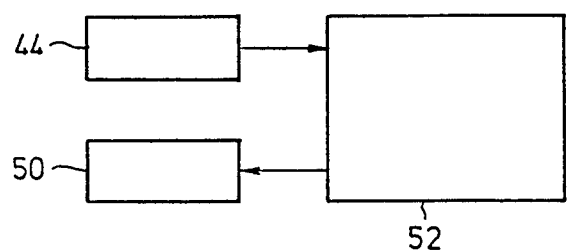
FIG. 7 is a block diagram of the second embodiment.

A second embodiment of the present invention will be described hereunder with reference to FIGS. 6 and 7. In these Figures, the same reference numerals are used to denote the same parts or members as those used in the first embodiment shown in FIG. 1, and detailed description of such parts or members is omitted.

The second embodiment features the use of a reversible blower 50 which can operate in forward and backward directions unlike the unidirectional blower 42 used in the first embodiment. More specifically, when the blower 50 operates in the forward direction, it positively suck and supplies ambient air into the reserver section 26 and the printing section 20 of the printing and developing system. When reversed, the blower 50 expels the air from the reserver section 26 while inducing moistened air from the developing section 14 which enters the reserver section 26. As shown in FIG. 7, humidity sensor 44 is connected to a control circuit 52 so that the control circuit 52 can receive a signal representing the level of humidity detected by the humidity sensor 44. The control circuit 52 then conducts a determination as to whether the detected humidity level is not lower than a predetermined level, and conduct a control operation such as to allow the blower 50 forward or backward in accordance with the result of the judgment.

In operation of the photographic printing and developing system, the photosensitive sheet 18 is continuously extracted from the roll in the magazine 16 and is fed into the printing section 20 where the photosensitive sheet 18 is subjected to an image exposure so that an image carried by a negative film is printed on the photosensitive sheet 18. The leading end of the photosensitive sheet 18 is fed to the developing section 26 through the reserver section 26.

In general, introduction of ambient air into the photosensitive sheet feeding line, particularly to the reserver section 26, is preferred even when the humidity of the ambient air is comparatively high. This is true because the existence of an air stream of a moderate velocity reduces any tendency for the photosensitive sheet to stick to the guide roller.

For instance, in the summer season in which the humidity of the in the reserver section 26 is generally high, the humidity sensor 44 which is sensitive to the humidity of the ambient air delivers the humidity signal to the control circuit 52 so that the control circuit 52 functions to start the blower 42 in the forward direction. As a result, the ambient air is introduced into the reserver section 26 and the printing section 20 to dehydrate the photosensitive sheet 18. As a consequence, any tendency for the photosensitive sheet 18 to cling about or wind around the guide roller or to fold, which tends to occur when the photosensitive sheet 18 is excessively moistened, is eliminated.

Conversely, in the season in which the humidity of the ambient air is comparatively low, the level of the humidity in the reserver section 26 also decreases correspondingly. The humidity sensor 44, upon detection of the low humidity of the ambient air, delivers a humidity signal to the control circuit 52 so that the control circuit 52 operates to reverse the blower 50. As a consequence, air is forcibly expelled from the reserver section 26 and the printing section 20. At the same time, air which has been moderately moistened in the developing section 14 naturally flows into the reserver section 26, because the reserver section 26 and the devloping section 14 are connected with each other. As a result consequence, humidity of a level optimum for the feed of the photosensitive sheet is established in the reserver section 26. As explained before, a level of humidity in the reserver section 26 which is too low tends to cause the generation of electrostatic charges on the photosensitive sheet 18 which in turn causes a sparking discharge with the results that the photosensitive sheet 18 is undesirably exposed to the light of the spark. This result in that the electronic devices in the photographic printing and developing system, e.g., a microcomputer and various sensors, are affected and fail to operate correctly. These problems, however, are overcome also by the second embodiment because the humidity of air in the reserver section 26 is prevented from becoming excessively low, by virtue of the natural flow of moistened air drafted from the developing section 14 by the reversing of the blower 50.

Figure 8:
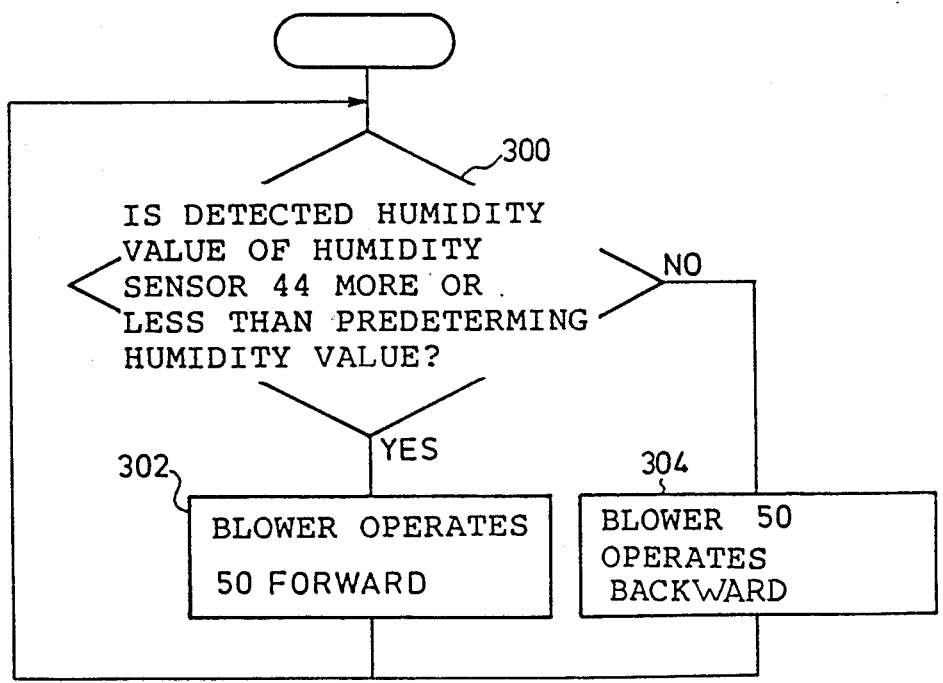
FIG. 8 is a flow chart illustrating an operation of the second embodiment.

This operation will be explained with reference to a flow chart shown in FIG. 8. In Step 300, a judgment is conducted as to whether the level of the ambient air humidity detected by the humidity sensor 44 is not lower than a predetermined humidity level. When the detected humidity is not lower than the predetermined level, the process proceeds to Step 302 in which the control circuit 52 operates to start the blower 50 in the forward direction thereby introducing the ambient air into the reserver section 26 of the photographic printing and developing system. On the other hand, if the determination conducted in Step 300 has proved that the ambient air humidity is below the predetermined level, the process proceeds to Step 304 in which the control circuit 52 serves to reverse the blower 42, thereby expelling the air from the reserver section 26 and the printing section 12 while introducing moistened air from the developing section 14.

The portion of the photosensitive sheet 18, having passed the reserver section 26 and now carrying a latent image thereon, is introduced into the developing section 14 so as to be processed through the developing bath in the tank 28, bleaching/fixing bath in the tank 30 and the rinsing bath in the tank 32. The thus processed photosensitive sheet is then dried in the drying chamber 38 and then cut by the cutter device 40, whereby independent photographs are obtained.

In the described embodiment, the blower 50 is selectively operated in opposite directions to induce the ambient air and to expel the air in the reserver section 26 under the control of the control circuit 52 which controls the operation of the blower in accordance with the result of determination as to whether the humidity of the ambient air as detected by the humidity sensor 44 is below a predetermined level or not. This, however, is not exclusive and the introduction of the ambient air into the reserver section 26 and discharge of air from the same can be controlled in various other ways.

For instance, the arrangement may be such that the humidity sensor 44 is disposed in the reserver section 26 to detect the humidity of air in this section 26 and the direction of operation of the blower 50 is changed in accordance with the result of a determination as to whether the detected humidity of air in the reserver section 26 is below a predetermined level.

In general, there is a tendency that the humidity of ambient air is high and low, respectively, in the summer and winter seasons and therefore so is the humidity in the reserver section 26. This means that excessive drying of air in the reserver section 26 takes place in winter season in which the ambient air temperature also is low. The arrangement, therefore, also may be such that a temperature sensor 44 which is capable of detecting the ambient air temperature is used in place of the humidity sensor 44 used in the first embodiment. Thus, the blower 50 is operated forewardly when the ambient air temperature is not lower than a predetermined level and is reversed when the ambient air temperature is below the predetermined level.

It is also possible that the operation of the blower is controlled in accordance with the result of a judgment as to whether the electrostatic charge on the photosensitive sensor exceeds a predetermined level.

In the second embodiment as described, the operation of the blower is automatically controlled in accordance with the state of the ambient air or the air in the reserver section 26. This, however, is only illustrative, and the invention does not exclude manual control of the blower conducted in such a manner as to manually control the direction of operation of the blower. It is also possible to control the blower such as to vary the speed of the blower or to intermittently operate the blower thereby to maintain a moderate level of humidity of the air in the reserver section 26.

What is claimed is:

1. A photographic printing and developing system including a printing section in which an image is printed on a continuous elongated photosensitive sheet, a developing section in which the image printed on said photosensitive sheet is developed, and a connecting section comprising a chamber through which said photosensitive sheet is fed from said printing section to said developing section so that images are successively printed and developed on said photosensitive sheet, said photographic printing and devloping system comprising:
   ambient air introduction means for positively introducing ambient air at least into said connecting section; and
   control means for controlling the operation of said ambient air introduction means in accordance with a predetermined condition.

2. A photographic printing and developing system according to claim 1, further comprising humidity sensing means capable of sensing the humidity of the ambient air and delivering a humidity signal to said control means thereby causing said control means to control the operation of said ambient air introduction means in accordance with said humidity signal.

3. A photographic printing and developing system according to claim 2, wherein said control means allows said ambient air introduction means to operate when the level of humidity detected by said humidity sensing means is not lower than a predetermined level and to prohibit the operation of said ambient air introduction means when the level of humidity detected by said humidity sensing means is below said predetermined level.

4. A photographic printing and developing system according to claim 1, further comprising temperature sensing means capable of sensing the temperature of the ambient air and delivering a temperature signal to said control means thereby causing said control means to control the operation of said ambient air introduction means in accordance with said temperature signal.

5. A photographic printing and developing system according to claim 4, wherein said control means allows said ambient air introduction means to operate when the level of temperature detected by said temperature sensing means is not lower than a predetermined level and to prohibit the operation of said ambient air introduction means when the level of temperature detected by said temperature sensing means is below said predetermined level.

6. A photographic printing and developing system according to claim 1, further comprising humidity sensing means capable of sensing the humidity of the air in said connecting section and delivering a humidity signal to said control means thereby causing said control means to control the operation of said ambient air introduction means in accordance with said humidity signal.

7. A photographic printing and developing system according to claim 6, wherein said control means allows said ambient air introduction means to operate when the level of humidity detected by said humidity sensing means is not lower than a predetermined level and to prohibit the operation of said ambient air introduction means when the level of humidity detected by said humidity sensing means is below said predetermined level.

8. A photographic printing and developing system according to claim 1, further comprising temperature sensing means capable of sensing the temperature of the air in said connecting section and delivering a temperature signal to said control means thereby causing said control means to control the operation of said ambient air introduction means in accordance with said temperature signal.

9. A photographic printing and developing system according to claim 8, wherein said control means allows said ambient air introduction means to operate when the level of temperature detected by said temperature sensing means is not lower than a predetermined level and to prohibit the operation of said ambient air introduction means when the level of temperature detected by said temperature sensing means is below said predetermined level.

10. A photographic printing and developing system including a printing section in which an image is printed on a continuous elongated photosensitive sheet, a developing section in which the image printed on said photosensitive sheet is developed, and a connecting section comprising a chamber through which said photosensitive sheet is fed from said printing section to said developing section so that images are successively printed and developed on said photosensitive sheet, said photographic printing and developing system comprising:
  reversible ambient air introduction means capable of positively introducing ambient air at least into said connecting section when operating in a forward direction and capable of discharging air from at least said connecting section when operating in a backward direction; and
  control means for switching the direction of operation of said ambient air introduction means in accordance with a predetermined condition.

11. A photographic printing and developing system according to claim 10, further comprising humidity sensing means capable of sensing the humidity of the ambient air and delivering a humidity signal to said control means thereby causing said control means to switch the direction of operation of said ambient air introduction means in accordance with said humidity signal.

12. A photographic printing and developing system according to claim 10, wherein said control means causes said ambient air introduction means to operate in said forward direction when the level of humidity detected by said humidity sensing means is not lower that a predetermined level and to cause said ambient air introduction means to operate in said backward direction when the level of humidity detected by said humidity sensing means is below said predetermined level.

13. A photographic printing and developing system according to claim 10, further comprising temperature sensing means capable of sensing the temperature of the ambient air and delivering a temperature signal to said control means thereby causing said control means to switch the direction of operation of said ambient air introduction means in accordance with said temperature signal.

14. A photographic printing and developing system according to claim 13, wherein said control means causes said ambient air introduction means to operate in said forward direction when the level of temperature detected by said temperature sensing means is not lower than a predetermined level and to cause said ambient air introduction means to operate in said backward direction when the level of temperature detected by said temperature sensing means is below said predetermined level.

15. A photographic printing and developing system according to claim 10, further comprising humidity sensing means capable of sensing the humidity of the air in said connecting section and delivering a humidity signal to said control means thereby causing said control means to switch the direction of operation of said ambient air introduction means in accordance with said humidity signal.

16. A photographic printing and developing system according to claim 15, wherein said control means causes said ambient air introduction means to operate in said forward direction when the level of humidity detected by said humidity sensing means is not lower than a predetermined level and to cause said ambient air introduction means to operate in said backward direction when the level of temperature detected by said temperature sensing means is below said predetermined level.

17. A photographic printing and developing system according to claim 10, further comprising temperature sensing means capable of sensing the temperature of the air in said connecting section and delivering a temperature signal to said control means thereby causing said control means to switch the direction of operation of said ambient air introduction means in accordance with said temperature signal.

18. A photographic printing and developing system according to claim 17, wherein said control means causes said ambient air introduction means to operate in said forward direction when the level of temperature detected by said temperature sensing means is not lower than a predetermined level and to cause said ambient air introduction means to operate in said backward direction when the level of temperature detected by said temperature sensing means is below said predetermined level.

19. A photographic printing and developing system including a printing section in which an image is printed on a continuous elongated photosensitive sheet, a developing section in which the image printed on said photosensitive sheet is developed, and a connecting section through which said photosensitive sheet is fed from said printing section to said developing section so that images are successively printed and developed on said photosensitive sheet, said photographic printing and developing system comprising:

ambient air introduction means for positively introducing ambient air at least into said connecting section; and control means for controlling the operation of said ambient air introduction means in accordance with a predetermined condition, wherein said connecting section is disposed between said printing section and said developing section, and includes guide roller means for absorbing differences of feeding speed of said photosensitive sheet between said printing section and said developing section, and temperature and humidity in said connecting section are controlled to provide for smooth feeding of said photosensitive sheet.

20. A photographic printing and developing system including a printing section in which an image is printed on a continuous elongated photosensitive sheet, a developing section in which the image printed on said photosensitive sheet is developed, and a connecting section through which said photosensitive sheet is fed from said printing section to said developing section so that images are successively printed and developed on said photosensitive sheet, said photographic printing and developing system comprising:

reversible ambient air introduction means capable of positively introducing ambient air at least into said connecting section when operating in a forward direction and capable of discharging air from at least said connecting section when operating in a backward direction; and control means for switching the direction of operation of said ambient air introduction means in accordance with a predetermined condition, wherein said connecting section is disposed between said printing section and said developing section and includes guide roller means for absorbing differences of feeding speed of said photosensitive sheet between said printing section and said developing section, and temperature and humidity in said connecting section are controlled to provide for smooth feeding of said photosensitive sheet.

* * * * *